United States Patent [19]
Shimizu et al.

[11] Patent Number: 4,870,453
[45] Date of Patent: Sep. 26, 1989

[54] MAGNIFICATION VARYING MECHANISM FOR IMAGE FORMING APPARATUS

[76] Inventors: Kenichi Shimizu; Shigeru Suzuki, both of c/o Ricoh Company Ltd., 1-3-6 Nakamagome, Ohta-ku, Tokyo, Japan

[21] Appl. No.: 232,443
[22] Filed: Aug. 15, 1988
[51] Int. Cl.$^4$ .................. G03B 27/36; G03B 27/38
[52] U.S. Cl. .................................. 355/59; 355/61
[58] Field of Search ............... 355/55, 56, 59, 61, 355/62, 72, 75

[56] References Cited
U.S. PATENT DOCUMENTS 4,105,327  8/1978  Gibson et al. ............... 355/61 X
4,218,133  8/1980  Biedermann ................. 355/56
4,375,916  3/1983  Levine ........................ 355/56 X Primary Examiner—Richard A. Wintercorn
Attorney, Agent, or Firm—David R. Thornton; Alfred E. Corrigan

[57] ABSTRACT

A copier for providing photographic copies of different sized originals, having an optical system variable for altering the magnification of an original, a scale member movable to locate the end of each respective size of original on the copier, and a link mechanism intercoupling the optical system and the scale to automatically vary the system magnification in accordance with the location of the scale.

4 Claims, 4 Drawing Sheets

MAGNIFICATION VARYING MECHANISM FOR IMAGE FORMING APPARATUS

BACKGROUND OF THE INVENTION

The present invention relates to a technique for changing over optical systems having different magnification powers upon alteration of the size of original in an image forming apparatus in which the original and a film are both disposed in the stationary state so that the original is imaged on a surface of the film and which apparatus is arranged such that a center portion of an original supporting stage is projected substantially onto a center portion of the film.

In the image forming apparatus in which an original is placed on a supporting stage and the image thereof is formed on a light sensitive medium such as film or the like, the original has to be so positioned that the center thereof coincides with that of the image regardless of variation in the size of the original. Otherwise, a portion of the original may be excluded from the image. Further, when originals of different sizes are to be taken on a film of a same size, there are required a plurality of lenses having different magnification powers in accordance with the sizes of the originals. Thus, operator must position an original and select the lens in accordance with the size of the original before photographing it.

However, the operator may neglect the above procedure and select a wrong lens, resulting in wasteful photographing to disadvantage.

In view of the drawback of the prior art described above, it is an object of the present invention to provide a magnification power varying mechanism for automatically changing the taking lens to the one having a requisite magnification power upon positioning of an original.

SUMMARY OF THE INVENTION

For achieving the abovementioned object, the present invention provides a magnification varying mechanism for an image forming apparatus arranged such that a center portion of an original supporting stage is projected substantially to a center portion of an image formed on a light sensitive medium, characterized by a scale for regulating end portions of originals of different sizes, optical systems including lenses having different magnification powers in accordance with the sizes of the originals and a mechanism for changing over the optical systems in interlock with the movement of the abovementioned scale.

DETAILED DESCRIPTION OF THE PREFERRED EMBODIMENTS

Figure 1:
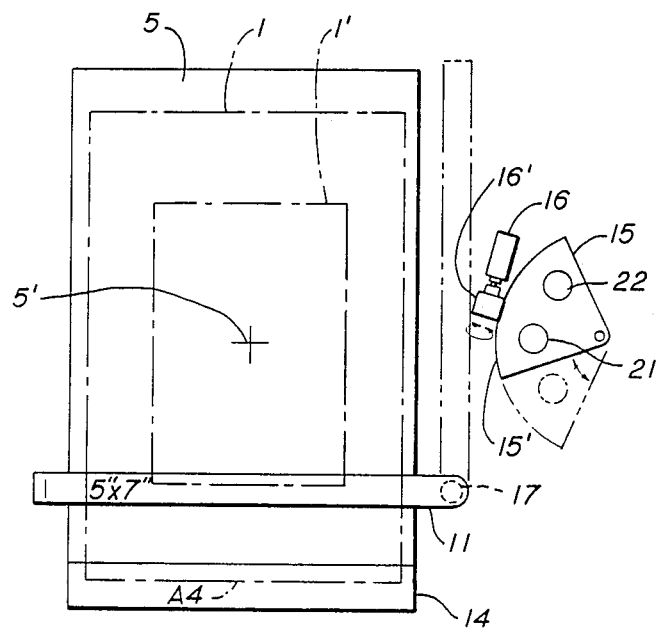
FIG. 1 is a plan view showing an exemplary embodiment of the present invention.

In the following, an exemplary embodiment of the present invention will be described. FIG. 3 shows an external appearance of an image forming apparatus which includes a press plate 2 for keeping an original in place, a photographing camera 3, and a manipulation field 4 for manipulating the apparatus. A general arrangement of the image forming apparatus to which the present invention is applied will be described by referring to FIG. 2. The original 2 is disposed on a contact glass plate 5 constituting an original supporting stage and kept immovably in place by the press plate 2. The original 1 is illuminated by a flash lamp 6, wherein light reflected from the original is reflected at a first mirror 7 and a second mirror 8 and transmits through an optical system 9 composed of a taking lens to be focused onto a film 10. The film 10 is contained in the camera 3 shown in FIG. 3, the exposure being effectuated by opening a shutter in synchronism with light emission of the flash lamp.

Figure 2:
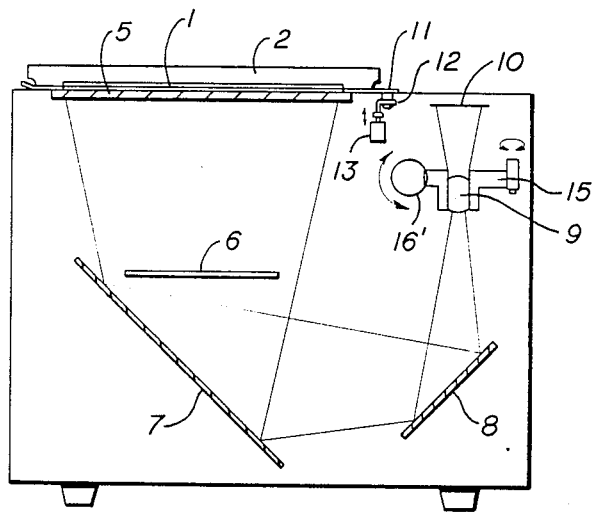
FIG. 2 is a schematic sectional view of FIG. 1.
Figure 3:
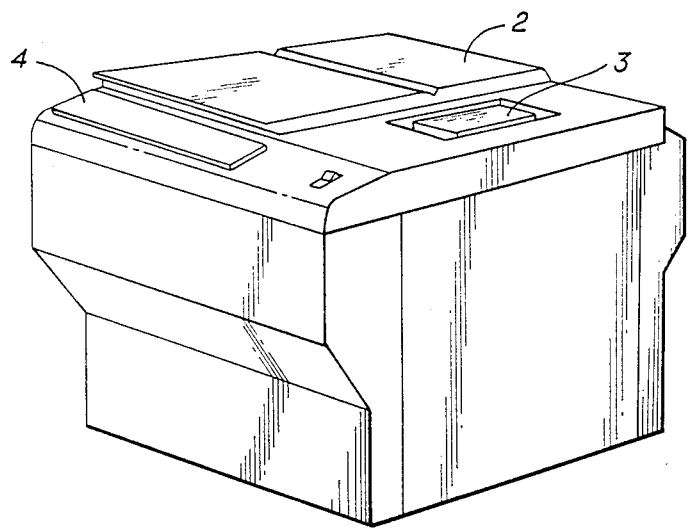
FIG. 3 is a view showing an external appearance of an image forming apparatus to which the present invention is applied.

FIG. 1 is a plan view showing an exemplary embodiment of the present invention, and FIG. 2 shows schematically an internal structure of the image forming apparatus associated with the exemplary embodiment. In the case of the exemplary embodiment of the present invention, two originals, i.e. an original of A4 size according to the ISO (210×297 mm) and an original of 5"×7" (127×178 mm) in size are demonstrated as the originals of different sizes, by way of example. A reference point 5' is provided in the vicinity of the center of the original supporting stage constituted by the contact glass plat 5 so that an image of the original corresponding to this reference point is projected to the center of the film.

The image forming apparatus is so arranged that the optical axis of the taking optical system constantly coincides with the reference point of the original supporting stage and that the flash lamp constituting the illuminating light source illuminates the original around the center of the original supporting stage. Since both of the stage and the flash lamp are disposed fixedly, it is required to align the center of the original with the reference point of the original supporting stage.

More specifically, the image forming apparatus must be able to copy high quality color images of different sizes on a surface of film by varying the magnification. In this conjunction, distribution of quantity of light illuminating the original is critical and it is difficult to ensure the distribution satisfactorily unless the optical axis remains constant.

Describing the exemplary embodiment of the present invention by referring to FIG. 1, a stationary scale 14 is fixedly provided at one edge of the contact glass 5 located at a bottom position as viewed in the figure. The original of A4 size can be positioned by abutting one end thereof against an end of the stationary scale 14. For positioning the original of 5"×7" in size, a movable scale 11 is provided. The movable scale can be rotated around a shaft 17 thereof from a set position (the position for setting in place the original of 5"×7" in size) shown in a solid line to a retracted position extending in parallel with a side of the contact glass 5 indicated by a dotted line for allowing the original of A4 size to be used.

The taking optical system 9 includes a lens 21 for the size of 5"×7" and a lens 22 for the A4 size both of which are disposed on a turret 15 so that a same size of image can be obtained by changing over the magnifications of these lens. When the movable scale 11 is set to the position for accommodating an original of 5"×7" in size, the lens for the size of 5"×7" is employed. When the movable scale 11 is moved to the retracted position for allowing an original of A4 size to be used, the lens for the size of A4 is employed. To this end, a mechanism of automatically changing over the lenses is incorporated, as is explained below.

Figure 4:
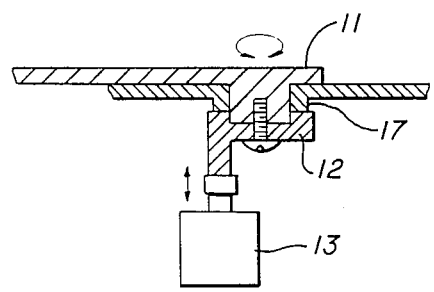
FIG. 4 is an enlarged view of a detecting means shown in FIG. 2.

Referring to FIGS. 1 and 2, when the movable scale 11 is rotated to the set position (position shown in the solid line) for imaging an original of 5"×7" in size, an actuator element 12 mounted on the shaft of the movable scale 11 presses a microswitch 13, whereby a signal is produced to rotate a motor 16 in one direction, as the result of which the turret 15 is rotated by way of a gear wheel 16' mounted on the motor shaft and a gear 15' formed in the turret 15 to thereby bring the lens 21 for the size of 5"×7" to the position of the axis of the taking optics. FIG. 4 shows in an enlarged view an associated detecting structure. When the abovementioned lens has attained the predetermined position, this is detected by a microswitch not shown, whereupon the motor 16 is stopped. The turret 15 is provided with a click stop not shown to fix the turret at the position where the axes of the optical systems are aligned. In this state, an original of 5"×7" in size can be abutted against the movable scale and photographed.

When an original of A4 size is to be photographed, the movable scale 11 is rotated to the retracted position shown in the dotted line in FIG. 1, whereupon the microswitch 13 is restored, producing a signal for rotating the motor 16 in the direction opposite to that mentioned above, as the result of which the turret 15 is rotated in the reverse direction by way of the gear wheels 16' and 15' until the lens for the A4 size has been set at the taking position. The stopping of the motor as well as operation of the chick stop is realized similarly to the manner mentioned before.

With the arrangement described above, operation of moving the movable scale to operative position or inoperative position by operator is interlocked with the automatic selection of the optical system having a proper magnification power.

Figure 5:
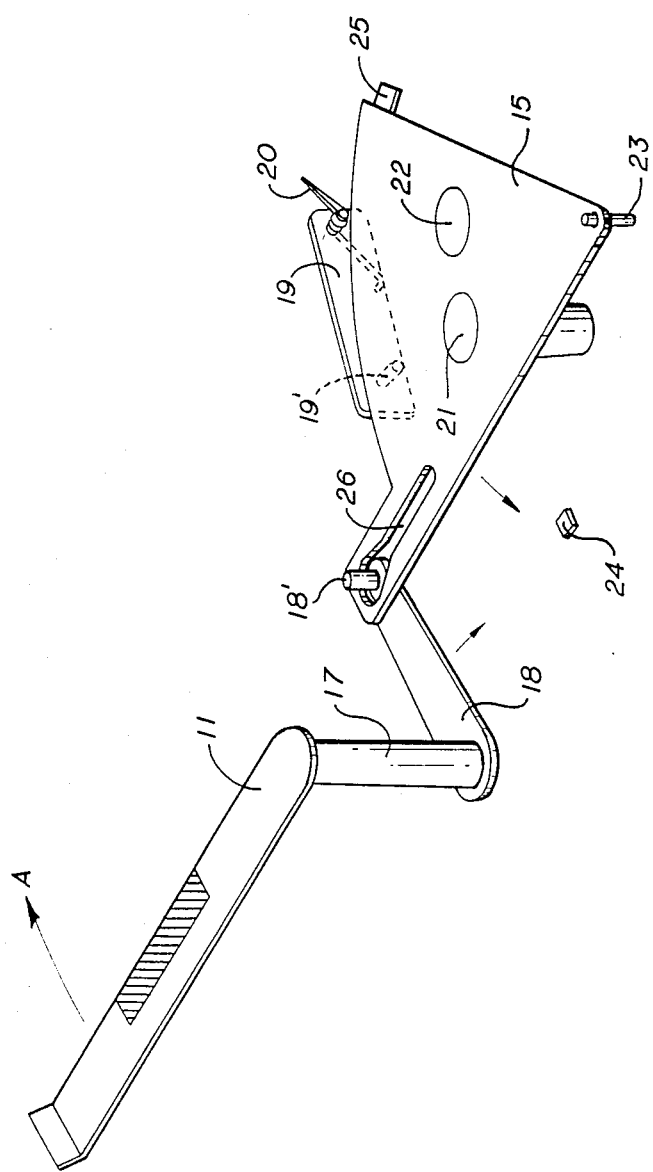
FIG. 5 is a perspective view showing another exemplary embodiment of the present invention.
Figure 6:
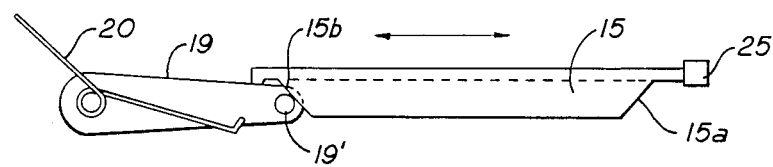
FIG. 6 is a schematic view showing a positioning mechanism in the embodiment shown in FIG. 5, and FIGS. 7 and 8 are sectional and plan views of other embodiment according to the present invention.

FIG. 5 shows another exemplary embodiment of the present invention according to which a change-over mechanism composed of a link mechanism is provided between the movable scale and the optical systems. When the movable scale 11 is rotated to the set position corresponding to one original, a lever 18 mounted on a rotatable shaft 17 for the movable scale 11 is rotated. A pin 18' anchored in the lever 18 at the other end thereof engages in an elongated slot-like groove 26 provided in the turret. Rotation of the lever 18 is transmitted to the turret 15 by way of the pin 18' and the groove 26, whereby the turret 15 is rotated around a shaft 23 thereof. When the lens 21 for the size of 5"×7" is brought to the taking position, an arm pin 19' of an arm 19 biased by a spring 20 rides on a slanted face 15a of the turret, resulting in that the turret 15 is pressed against a stopper 25, whereby the optical axis of the optical system is positioned in alignment (FIG. 6).

When the other original of A4 size is used, the movable scale 11 is rotated to the retracted position. In this case, the lever 18 and the turret 15 are rotated in the direction reverse to that mentioned above, whereby the lens for the A4 size is set to the taking position by the turret, while the arm pin 19' abuts on a slanted face 15b of the turret 15 provided on the opposite side to press the turret against the stopper 24. Positioning of the optical axis is thus accomplished. According to the instant embodiment, the motor and the microswitch can be spared, being attendant with reduction in cost. Besides, due to the mechanical structure, reliability is also enhanced.

Figure 7:
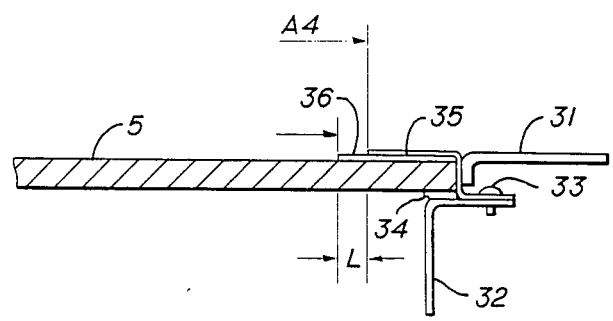
Figure 8:
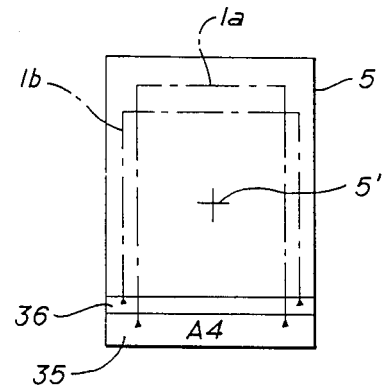

FIGS. 7 and 8 shows an exemplary embodiment applicable to the movable scale 11 and the stationary scale 14 described above. As the means for positioning an original of slightly different size, the scale is constituted by a scale provided with an offset. A numeral 36 designates a scale for positioning an original having a letter size according to the U.S.A Standards (216×279 mm), and 35 designates a scale for positioning an original of A4 size according to the ISO (210×297 mm), wherein both scales are fixedly mounted on the original supporting stage in a superposed state. The original of the letter size is abutted against a front end of the scale 36 for the positioning thereof, while the original of A4 size is abutted against a front end of the scale 35. A numeral 31 denotes a cover, 32 denotes a side plate having the scale for letter size mounted at one end, 33 denotes a set screw, and 34 denotes a spacer. In FIG. 8, $1a$ indicates the set state of an original of the A4 size and $1b$ indicates the state of an original of the letter size.

The scales 35 and 36 may be implemented in one scale formed with the offset. Further, a plurality of offsets may be provided for coping with various sizes of originals. The illustrated embodiment is very effective in handling originals of sizes differing only slightly within a range in which the magnification powers of the lenses need not be changed over. By applying this embodiment to the stationary scale 14 and the movable scale 11, the apparatus can deal with originals of numerous types.

According to the present invention, the scales are provided in correspondence with the sizes of originals, wherein the optical system having a proper magnification power can be selected by abutting an end of an original against the selected scale. Thus, photographing of high quality color image can be carried out in a simplified manner without mishandling.

What is claimed is:

1. A magnification varying mechanism for a copying apparatus comprising a movable scale for positioning an edge portion of originals of different sizes on said apparatus, a variable optical system including lenses providing different magnification powers in accordance with the sizes of the original coupling, means responsive to the location of said scale for varying the optical system in accordance with the location of said scale.

2. The mechanism of claim 1 wherein said optical system includes a plurality of lenses mounted in a lens carrier, each lens associated with an original of given size respectively, said lens carrier being mounted for more movement to carry each of said lenses between a first inoperative position off the optical axis of said optical system and a second operable position on the axis of said system, and said coupling means includes a lever intercoupling said scale and said lens carrier to locate each respective lens in its operative position in accordance with positioning of a given size original by said scale.

3. The mechanism of claim 1 wherein said coupling means includes sensing means for sensing the location of said scale and means responsive to said sensing means for varying said optical system.

4. A copying apparatus for producing a copy of originals of different sizes, said apparatus comprising:
- a supporting stage configured for supporting an original to be copied at a central reference point of said stage;
- an optical system operable to produce an image on copy film of an original generally centered at said reference point, said optical system including varying means for varying the magnification of said optical system;
- a movable scale member for locating an edge portion of different sizes of originals such that the center of each respective original is generally located at said reference point; and
- means intercoupling said varying means and said scale member for varying the magnification of said optical means in accordance with the location of a selected size of original at said reference point.

* * * * *